No. 859,941. PATENTED JULY 16, 1907.
E. A. HENKLE.
DIAL FOR SPEED RECORDING INSTRUMENTS.
APPLICATION FILED JAN. 24, 1906.
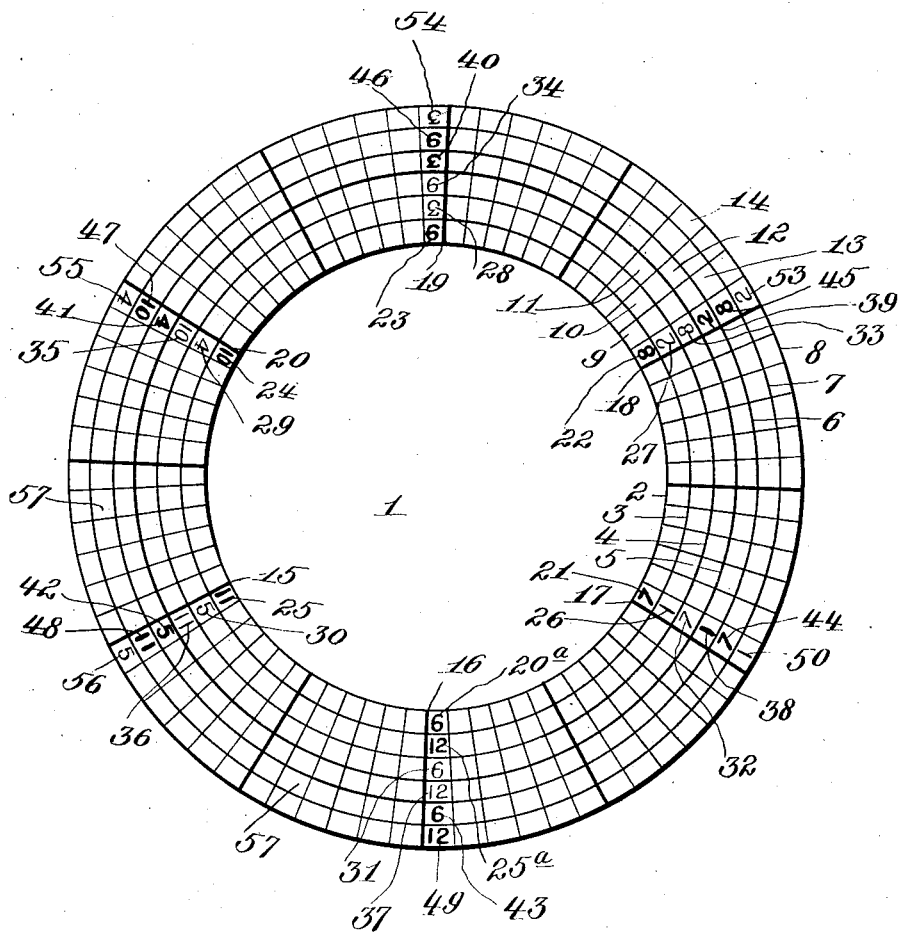
Witnesses:
C. P. Kesler
Inventor
Edward A. Henkle
By James L. Norris
Atty.

UNITED STATES PATENT OFFICE.

EDWARD A. HENKLE, OF PHILADELPHIA, PENNSYLVANIA, ASSIGNOR TO INTERNATIONAL SPEED REGISTER CO., OF PHILADELPHIA, PENNSYLVANIA, A CORPORATION OF NEW YORK.

DIAL FOR SPEED-RECORDING INSTRUMENTS.

No. 859,941.      Specification of Letters Patent.      Patented July 16, 1907.

Application filed January 24, 1906. Serial No. 297,620.

*To all whom it may concern:*

Be it known that I, EDWARD A. HENKLE, a citizen of the United States, residing at Philadelphia, in the county of Philadelphia and State of Pennsylvania, have invented new and useful Improvements in Dials for Speed-Recording Instruments, of which the following is a specification.

This invention relates to recording dials for speed-recording instruments, carried by vehicles or used for other purposes, and aims to provide a dial of such class, in a manner as hereinafter referred to, for overcoming the disadvantages present when using what may be termed a one-hour-revolution dial which is revolved for recording every hour, or, when using what may be termed a twelve-hour-revolution dial, which is revolved for recording every twelve hours.

In what is termed the one-hour-revolution dial in order to obtain an intelligent record of the movements of a vehicle for its working day, it is necessary to provide such dial with a very large number of concentric circles in order to have hour spaces enough to cover not only the actual travel of the largest possible delivery day, but also the time elapsing between the placing of the dial in the instrument the night before and the commencing of the record, at the start of the wagon in the morning, (in practice preferably thirty-six hour spaces) which makes, on a desirable size dial, the hour spaces between the circles so small that great difficulty is experienced in reading the perforations, or dots, for indicating the record; and the multiplicity of circles necessary to indicate any considerable number of consecutive hours of travel, must result in such a close jumble of dots, or punctures, that reading becomes difficult and confusing if not altogether impossible; or else it is necessary to provide mechanism in the instrument with which the dial associates, to either return the recording point to the starting point for it to retrace its movement over the unperforated portion of the dial; or to provide the instrument with which the dial associates with mechanism to cause the recording to commence at the starting of the vehicle, which adds complication to the register, and is therefore undesirable in practice.

The operation of the one-hour-revolution dial, is as follows: It being assumed that the dial contains a sufficient number of circles to constitute at least twenty-four hours, beginning at 6 p. m., the first twelve hours will terminate at 6 a. m.; and the second twelve hours at 6 p. m. the next day. It is also to be stated that the usual practice is to change the dial upon the vehicle as soon as it returns to the stable after its day's work, and it will be assumed, by way of example, that the dial is changed at 8 p. m.—the recording point, therefore, will be set at that point, the clock wound and closed. The mechanism continues to operate and the recording point travels to cover space, (but without recording) until the departure of the wagon—say at 7 a. m., at which time the recording upon the dial begins. It is therefore obvious that the recording point will pass off the dial and the record end at 6 p. m., which might be before the wagon is ready to return; or, if the dial contains thirty hours, it will end at midnight; thus probably affording a sufficient record, but the spaces will be so minute, that the record cannot be intelligibly read. To avoid this, it is necessary to place a mechanism in the register to cause the recording point to return to its starting point and register over the unpunctured part of the dial; or, to place a mechanism in the register to cause the point to remain inoperative until the wagon starts; in which case, the puncturing starts at the first circle and continues for the number of hours the wagon is out, but in this case the hours cannot be printed on the circles as an arbitrary value attaches to each circle, according to the hour at which the vehicle departed, which said hour must be known before the dial can be read, and which information must be obtained from other sources than the dial itself, thus absolutely destroying its value as an authentic record.

In what may be termed twelve-hour revolution dials, the objection is that there is not sufficient space for close registration, without having the punctures or dots run into each other, or increasing the size of the dial beyond the limits of practicability.

The foregoing disadvantages are avoided in a manner as hereinafter referred to, by a dial in accordance with this invention; and briefly described, such form of dial consists of six circular spaces; each circular space divided into six major divisions, each suitably designated to indicate an hour, such hour being ante-meridian or post-meridian as the case may be, with the hours constituting one circular space different from the hours constituting an opposing circular space, the said suitably-designated major divisions of each circular space being subdivided into as many more subdivisions, indicating fractions of an hour, as is desired.

With the foregoing and other objects in view, the invention consists of the novel form of dial for speed-recording instruments for vehicles, or for other purposes, as hereinafter more specifically referred to and illustrated in the accompanying drawings, wherein is shown the preferred embodiment of the invention; but it is to be understood that changes, variations, and modifications can be resorted to which come within the scope of the claims hereunto appended.

The drawing illustrates a face view of a dial in accordance with this invention.

Referring to the drawing by reference characters, a dial, in accordance with this invention, consists of a piece of suitable material having printed or otherwise placed thereon, a series of concentric circles 2, 3, 4, 5, 6, 7 and 8, forming a series of circularly-arranged parallel spaces 9, 10, 11, 12, 13 and 14, each of which is divided by radially-extending lines 15, 16, 17, 18, 19 and 20, into six major divisions, each of said major divisions of each circular space being suitably designated to constitute a certain hour of the day, such hour being ante or postmeridian, as the case may be. The designation for the major division of the circular space 9 are the hour indications 6, as at 20$^a$; the hour indication 7 as at 21; the hour indication 8 as at 22; the hour indication 9 as at 23; the hour indication 10 as at 24; and the hour indication 11 as at 25. The designations for the major divisions of the circular space 10 are the hour indication 12 as at 25$^a$; the hour indication 1 as at 26; the hour indication 2 as at 27; the hour indication 3 as at 28; the hour indication 4 as at 29; and the hour indication 5 as at 30. The designations for the major divisions of the circular space 11 are the hour indication 6 as at 31; the hour indication 7 as at 32; the hour indication 8 as at 33; the hour indication 9 as at 34; the hour indication 10 as at 35; and the hour indication 11 as at 36. The designations for the major divisions of the circular space 12 are the hour indication 12 as at 37; the hour indication 1 as at 38; the hour indication 2 as at 39; the hour indication 3 as at 40; the hour indication 4 as at 41, and the hour indication 5 as at 42. The designations for the major divisions of the circular space 13 are the hour indication 6 as at 43; the hour indication 7 as at 44; the hour indication 8 as at 45; the hour indication 9 as at 46; the hour indication 10 as at 47; and the hour indication 11 as at 48. The designations for the major divisions of the circular space 14 are the hour indication 12 as at 49; the hour indication 1 as at 50; the hour indication 2 as at 53; the hour indication 3 as at 54; the hour indication 4 as at 55; and the hour indication 5 as at 56. Each major division of each circular space is divided by a series of radially-extending lines 57 into a series of subdivisions to indicate the fraction of an hour, as shown. These subdivisions are twelve in number, so that each subdivision is what may be termed a five-minute space, and which will be found in practice to give sufficiently-accurate reading. The designations for indicating the hour for each major division are of such style that antemeridian and postmeridian will be indicated, and, by way of example, the designations for the major divisions to constitute antemeridian indication are printed in light type and the designations for the major divisions to constitute postmeridian indication are printed in heavy type. Other means than that which is shown for indicating ante and postmeridian may be employed, for example, by printing a tint or color over the postmeridian spaces, or to indicate in some manner a difference between the antemeridian spaces and the postmeridian spaces.

From the foregoing description, it is evident that a dial may be made within a reasonable size which is adapted to contain a record of speed expressed in dots or punctures, each dot representing a distance of nto more than one-eighth of a mile at a sufficient distance from each other to be clearly and distinctly legible; and that said record is contained in a minimum number of circularly-disposed spaces to express a reasonable amount of time; for example: three circular spaces for eighteen hours and four circular spaces for twenty-four hours, each of which spaces may be made of at least double the width of the one hour dial spaces, thus preventing confusion in reading; and furthermore, the dial is provided with means for clearly indicating whether the hour is antemeridian or postmeridian.

The operation of a dial in accordance with this invention is as follows: Starting at 6 p. m., in the circular space 9, the dial may be placed on the register at any time during the evening, say, for example, the dial is placed on the register at 7 p. m.; at 12 p. m. it having completed the first circle, the recording point jumps into the next circle and runs until 6 a. m. when the vehicle starts. It then has until 6 a. m. on the second day following for registration; and, therefore, it will be evident that the spaces for registration are twice as great as on a twelve-hour-revolution dial of equivalent size, thus enabling the recording point to register at closer intervals than can possibly be obtained on the twelve-hour-dial, on the one hand and avoiding the closeness and complexity of the one-hour-revolution dial on the other hand. This form of dial can, by three revolutions of actual registration, indicate an actual run of eighteen hours which would be a long delivery day; or, four circular spaces to indicate a twenty-four-hour actual run as against eighteen or twenty-four circles in the case of a one-hour-revolution dial.

In what may be termed the one-hour-revolution dial, in practice, the record, in order to be of any practical value must cover at least thirty, or, better still, thirty-six hours; and if the vehicle runs any considerable consecutive number of hours, the number of recording dots or punctures each indicating say one-eighth of a mile, will be so confusing, owing to their close proximity to the next succeeding hour circles that it is difficult and tedious, if not impossible to read them; and in addition, the least vibration or inaccuracy of the register carries the line of recording dots over the printed line of the dial and into the next line of punctures and causes great confusion; and, in the twelve-hour-revolution dial, there is not sufficient space in each hour-division to indicate each one-quarter mile at—say fifteen miles an hour; while it is desirable to indicate at least every one-eighth of a mile. In a form of dial in accordance with this invention, the spaces are ample for recording eighths of a mile at twenty or more miles an hour, which is in excess of the usual speed for a horse-drawn vehicle; and if the punch for a full mile is larger or longer, or in any way distinguishable from the fractional punches, there is obtained a very legible dial at the very highest rate of speed a horse can travel; a result which cannot now be obtained by any dial now used or known.

Having thus fully described my invention, what I claim as new and desire to secure by Letters-Patent is:

A dial comprising a plurality of concentrically spaced circles and radial lines dividing said spaces into sub-spaces, the first series of concentric sub-spaces having in every twelfth sub-space numbers representing p. m. hours, the second series similarly divided and being a numerical continuation of said first series to represent hours of the day, whereby the requisite number of sub-spaces having the requisite amount of recording space is provided with a minimum sized dial, the p. m. hours being in different type from the a. m. hours.

In testimony whereof I have hereunto set my hand in presence of two subscribing witnesses.

EDWARD A. HENKLE.

Witnesses:
 JUNIUS HOWE,
 M. E. MERING.